July 16, 1957 R. B. BLACK 2,799,258
SPLIT CYCLE INTERNAL COMBUSTION ENGINE WITH ROTARY SLEEVE VALVE
Filed Dec. 12, 1955 3 Sheets-Sheet 2

INVENTOR
Robert B. Black.
BY Roy A. Plant
ATTORNEY

July 16, 1957  R. B. BLACK  2,799,258
SPLIT CYCLE INTERNAL COMBUSTION ENGINE WITH ROTARY SLEEVE VALVE
Filed Dec. 12, 1955  3 Sheets-Sheet 3
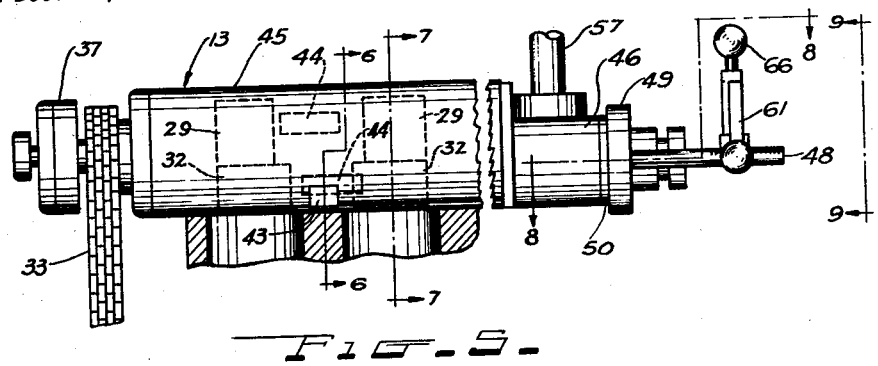
FIG-5-
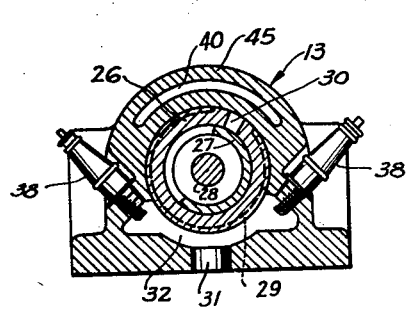
FIG-7-
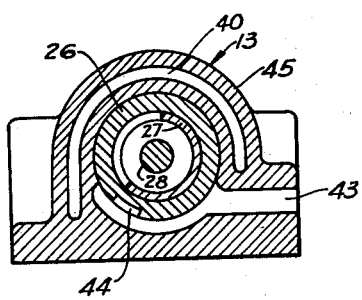
FIG-6-
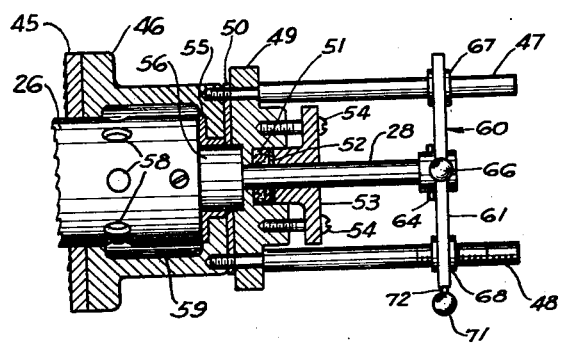
FIG-8-
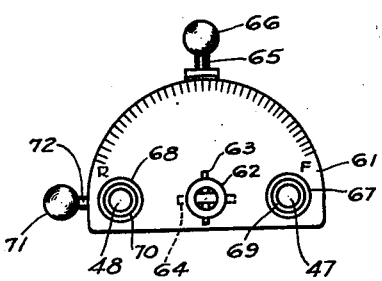
FIG-9-
INVENTOR
Robert B. Black.
BY Roy A. Plant
ATTORNEY.

United States Patent Office 2,799,258
Patented July 16, 1957

2,799,258
SPLIT CYCLE INTERNAL COMBUSTION ENGINE WITH ROTARY SLEEVE VALVE

Robert B. Black, Corpus Christi, Tex.

Application December 12, 1955, Serial No. 552,307

7 Claims. (Cl. 123—41)

The present invention relates broadly to power producing equipment, and in its specfiic phases to split-cycle internal combustion engine assemblies wherein the engine includes a rotary sleeve valve mechanism.

At the present time about 99% of all internal combustion engines are of the four-cycle type, and the others are largely of the conventional two-cycle type commonly used on washing machines, lawn mowers, and motorcycles. Practically all internal combustion engines use poppet valves, and it is generally recognized that the present types of those engines using spark ignition have reached a plateau in their development. Even though there is an increasing need for higher over-all efficiency and greater capacity in proportion to bulk and weight, improvements have been limited to refinements while adhering to basic concepts which were established almost a century ago.

The conventional four stroke or Otto cycle engines require four phases or operations which succeed each other in the following order: (1) aspiration (admission of the combustible charge into the cylinder), (2) compression of the charge, (3) combustion of the charge (includes ignition and expansion of the charge), and (4) expulsion of the waste products of combustion. It is thus clear that for the first two strokes the engine acts as a compressor, and for the last two strokes as an engine. It is impossible to design a single mechanism which will function efficiently both as a compressor and as an engine because of inherent necessity of the engine concept involves predetermined piston clearance to obtain suitable limited compression ratios, and these are antagonistic to ideal performance of the assembly as a compressor since the latter calls for small piston clearance and higher compression ratios. The present methods of executing the required valve events with poppet valves also fall far short of ideal requirements for either compressors or engines.

On the surface the self-breathing or engine compression principle of four-cycle engines appears to be a simple and logical plan in that a single mechanism is made to serve both as a compressor and as an engine. However, a closer look reveals certain flaws in this system which are responsible for the most significant limitations of present volatile fuel engines utilizing a carburetor and spark ignition. Thermal efficiency, for instance, is a fuction of the expansion ratio since the higher the expansion ratio the greater is the percentage of heat which is converted into available power, or in other words the amount of power obtained per pound of fuel. With conventional self-breathing engines it is impossible to utilize high expansion ratios without necessitating correspondingly high compression ratios with higher temperatures which are conducive to pre-ignition and detonation where fuel-air mixtures are involved. These self-breathing engines must pump their own air for combustion and thus their power output capacity is limited by their own ability to pump air.

These self-breathing engines of the spark ignited four-cycle type inherently have unfavorable "peak-type" power production which makes the use of a transmission an absolute necessity. Even in its most refined and improved form a transmission must be considered a necessary evil involving extra weight, bulk, connecting mechanism, maintenance, parasitic drag, and added initial expense, all of which are distinct disadvantages. Piston clearance is another factor adversely affecting the breathing and combustion characteristics, and consequently the power output of self-breathing spark ignited engines. The clearance space gases reduce the volumetric efficiency of the engine and expand on the aspiration or intake stroke to reduce the amount of combustible gas mixtures drawn into the engine, with the latter becoming more and more pronounced as engine speeds increase. The residual gases also contaminate and dilute the combustible mixture so as to not only reduce the power output of the engine from that standpoint, but they further affect combustion efficiency, since complete combustion not only requires a correct fuel-air ratio, but also great turbulence, high temperature combustion chamber walls, and still more important, freedom of the fuel-air mixture from contamination with inert waste gases and vapors prior to ignition. Self-breathing engines also require starting mechanisms since as soon as they stop, breathing stops, and there is no power until the engine is cranked by an auxiliary mechanism to pump the fuel-air mixture to operate the engine.

Poppet valves, because of inherent shortcomings, also contribute further to the limitations of present day engines. Some of these shortcomings are (1) inability to open and close the ports with the suddenness which is essential to best performance, (2) flow restrictions due to slow opening and closing of ports, and excessive friction and turbulence caused by unfavorable valve port shape and passages, (3) excessive drag resulting from high inertia and frictional losses inherent in this type of mechanism, (4) hot valves which contribute to pre-ignition and detonation under high compression ratios, and (5) excessive vibration and valve noise. It was a recognition of the above problems and difficulties with the use of poppet valves, as well as the shortcomings of two and four-cycle self-breathing spark ignition engines, and the lack of any adequate solution to same, which led to the conception and development of the present invention.

Accordingly among the objects of the present invention is the provision of a highly efficient spark ignition split-cycle internal combustion engine.

Another object is to provide an efficient rotary sleeve valve type of split-cycle internal combustion engine.

Another object is to provide a split-cycle internal combustion engine assembly of either counterflow or uniflow types which is reversible, self-starting, of small clearance, and has a rotary sleeve valve.

Another object is to provide an internal combustion engine which is free from compressor functions, and utilizes variable inlet cut-off of combustible gases which makes possible variable expansion ratios to meet varying operating requirements.

Another object is to provide an internal combustion engine which has the advantages of high compression ratios without the problems associated with same.

Another object is to provide a reversible internal combustion engine which has identical power characteristics under conditions of rotation in either direction.

A further object is to provide an internal combustion engine where compression of the air for the fuel-air mixture is accomplished by a separate compressor, and which engine is self-starting due to the air for the air-fuel mixture being stored under relatively high pressure ready for use.

A further object is to provide a split-cycle internal combustion engine of either the counterflow or uniflow types wherein same has a rotary sleeve valve facilitating reversible self-starting, and wherein said valve assembly is provided with vent means for automatically venting, under either direction of rotation, products of combustion during a portion of the piston stroke prior to receipt of a fresh charge of a combustible gaseous fluid.

Still further objects and advantages of the present invention will apepar as the description proceeds.

To the accomplishment of the foregoing and related ends, the invention, then, consists of the power generation means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

Figure 1 shows a V-type uniflow engine in diagrammatic cross-sectional elevation form embodying the present invention looking rearwardly, wherein the piston of the left-hand cylinder is moving downward in an expansion cycle stroke and the piston in the right-hand cylinder is at the bottom of its expansion cycle stroke with the exhaust parts uncovered for delivery of expanded products of combustion to the primary exhaust.

Figure 5 shows a fragmentary partially sectioned view of the engine of the present invention to illustrate the arrangement of certain of the parts including the exhaust elements in the rotary sleeve valve assembly.

Figure 6 shows an enlarged cross-sectional view of the rotary sleeve valve assembly at the exhaust outlet as seen at line 6—6 of Figure 5, looking in the direction of the arrows.

Figure 7 shows an enlarged cross-sectional view of the rotary sleeve valve assembly as seen at line 7—7 of Figure 5, looking in the direction of the arrows.

Figure 8 shows a partially sectioned top view of the inlet end of the valve assembly as seen at line 8—8 of Figure 5, looking in the direction of the arrows.

Figure 9 shows an end view of the cut-off sleeve control assembly as seen at line 9—9 of Figure 5, looking in the direction of the arrows.

In my copending patent application Serial No. 270,350, filed February 7, 1952, now Patent No. 2,726,646, I have disclosed a uniflow engine with a rotary sleeve valve assembly having a shiftable cut-off valve inside of same. The drive, labyrinths, adjustments, et cetera, of that assembly are directly applicable to the engine of the present invention which involves certain improvements in same to adapt the engine to more efficient split-cycle internal combustion use with many of the features shown diagrammatically for ease of explaining the principles and construction involved. The present engine is also self-starting, reversible, and self-relieving of products of combustion in the cylinder on the return stroke following explosion, under conditions of rotation in either direction.

The power generation system of the present invention deals broadly with what can be termed a split-cycle internal combustion engine apparatus of either counterflow or uniflow construction utilizing a rotary sleeve valve adapted to deliver a combustible mixture to each cylinder at the proper time, and to bleed off products of combustion in each cylinder during a portion of the period when the piston of that cylinder is returning to the rotary sleeve valve end of same prior to admission of a new charge of combustible gaseous fluid. The only difference between uniflow and counterflow engines is that with the uniflow type a major portion of the products of combustion are exhausted at the end of the power stroke and the residue during the return stroke, while with the counterflow type all of the exhausting takes place during the return stroke.

Figure 1:
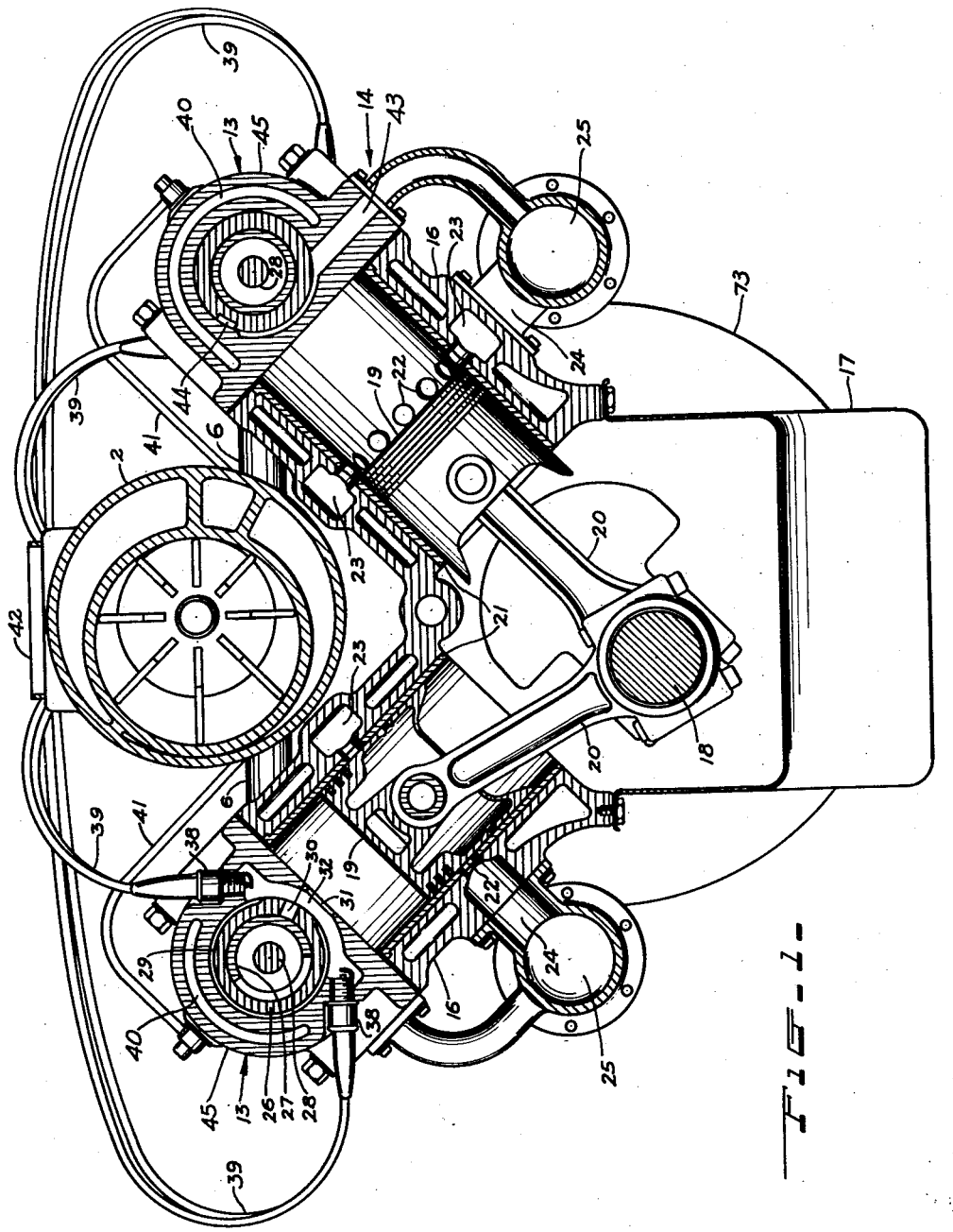
Figure 3:
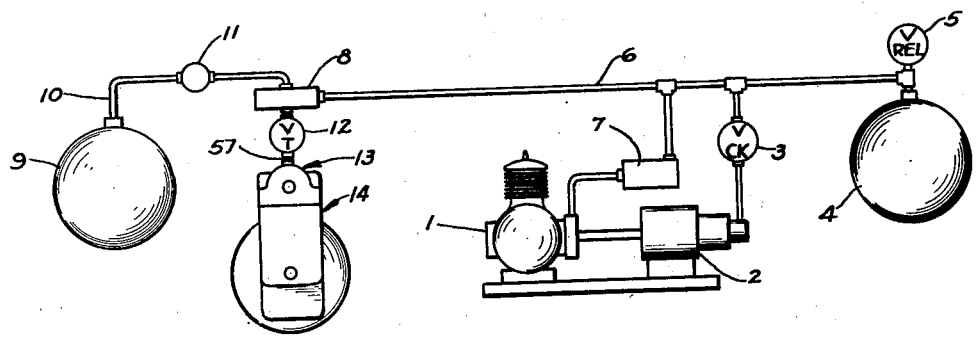
Figure 3 shows a schematic diagram of the complete system wherein the air compressor is operated by a separate prime mover of any suitable type.
Figure 4:
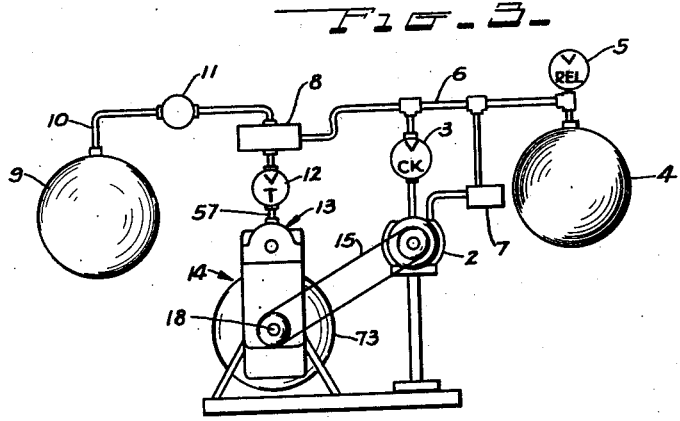
Figure 4 shows a schematic diagram of a system similar to that of Figure 3 except that the compressor is direct driven by the main engine of the present invention.

Referring more particularly to Figures 3 and 4, two forms of the over-all system are shown and will now be described in detail. The assembly of Figure 3 utilizes a small prime mover 1, of any suitable type, to drive a compressor 2 which can also be of any suitable type, such as of piston and cylinder form, but preferably of the sliding vane construction as shown in Figure 1.

The outlet of this compressor is suitably connected through a check valve 3 to a compressed air storage tank 4 which has a safety or pressure relief valve 5. Connected to the main air line 6 of the system is a governor member 7 of conventional construction adapted to be set for controlling the operation of prime mover 1 so as to either speed up or slow down that prime mover to hold the pressure in storage tank 4 at the predetermined level. The main air line 6 is connected to a pressure type carburetor, or air-fuel mixer 8 in conventional manner. This mixer 8 is of conventional construction which, in one form, will mix a gaseous fuel with air in suitable proportions, and in another form will mix a liquid fuel with air in suitable proportions, for internal combustion engine use.

A fuel tank 9 is connected through fuel line 10 to the pressure type carburetor 8 through a suitable fuel pressure controlling means 11. Where the fuel is in the form of high pressure combustible gases, such as propane, natural gas, or the like, and usually liquified, the pressure controlling means 11 would be in the form of a pressure reducer so as to deliver the combustible fluid to carburetor 8 at a suitable pressure for mixing with the compressed air delivered through main air line 6 to the carburetor. On the other hand, if the fuel in fuel tank 9 is of the type which is normally liquid at atmospheric pressures, such as gasoline, kerosene or the like, then the fuel pressure controlling means would be in the form of a pump adjusted to deliver the fuel at the desired pressure to carburetor 8 for mixing by injection, or otherwise, with the compressed air at that point. Normally high pressure combustible gaseous fuel of the general type noted above is highly desirable for starting use when the engine is cold, and even at all times, but if desired a liquid fuel cuch as gasoline can be used, but even here gaseous fuel can be used to start the engine and run it till it warms up, and it is intended that the drawing be considered to diagrammatically show same. If desired a throttle valve 12 can be inserted between carburetor 8 and the rotary sleeve valve assembly 13 of the split-cycle internal combustion engine 14. The throttling of the engine is also and more commonly controllable through adjustments of the cut-off valve of the sleeve valve assembly, as will be hereinafer set forth.

In some instances, it may be desirable to drive the compressor 2 direct from the split-cycle internal combustion engine 14, and this may be accomplished as is shown, for instance, in Figure 4 through a conventional drive means such as a silent chain 15. In this case it will be necessary to initially supply air storage tank 4 with air at a suitable pressure in order to make the system self-starting, after which the system would be self-sustaining.

The governor member 7 in this case would be one which would control the output of air compressor 2 so as to maintain the desired pressure in compressed air storage tank 4. The compressor 2 in any event would have to have an air pumping capacity in excess of the maximum requirements for the over-all operation of the split-cycle internal combustion engine 14.

It should be noted that with a split-cycle system, such as is here involved, the pumping of air and the compression of same ready for delivery into the engine in the space above the head of the piston is all done outside of the engine cylinders themselves and thus takes care of what is known as the aspiration and compression cycle portion of the conventional Otto or four-cycle engine system. All this leaves for the engine itself to do is to expand the gaseous fluid, which exerts pressure on the head of the piston, and at the end of the expansion cycle to discharge the spent products of combustion. The engine thus acts solely as an engine and takes care of the third and fourth cycles (expansion and discharge of the products of combustion) of the conventional four-cycle engine. However, there are many advantages of using this split-cycle, since, for instance, it eliminates the shortcomings of using the same piston and cylinder, not only for drawing in air into the cylinder and then compressing same, which is truly a compressor function, and then following it in the same cylinder with the engine function of expanding the gaseous fluid under pressure and discharging the residue. Piston clearance and compression ratios are in conflict with each other, when used in one assembly, so far as best compressor and best engine practices are concerned, as has been explained above. These conflicts are, of course, avoided by using the split-cycle system wherein higher compression ratios can be utilized, smaller clearance for the piston at the head end of the cylinder, et cetera. This system also makes possible a power stroke during each revolution of the engine for each cylinder, and further due to the use of high pressure inlet gaseous fluids and the special type of valve mechanism, this engine can run equally well in either direction and is self-starting in either direction. In order that there will never be a dead center situation which would interfere with self-starting, the engine should have at least three cylinders and for most purposes the number of cylinders would be in the range of from three to twelve or more and which can be arranged in various ways such as in line, Figures 3 and 4, or of the V-type as has been shown in Figures 1 and 2.

Referring to Figure 1 the engine 14 there shown is of V-type having a motor block 16, a flywheel 73, and a crank case 17. The crank shaft 18 is supported on suitable bearings (not shown) in the motor block 16 in conventional manner. Pistons 19 are connected to crank shaft 18 in conventional manner by means of connecting rods 20. If desired, the motor block can be conventionally fitted with cylinder liners 21 with the block and liners provided with perforations, or ports 22 which open into a circumferential primary exhaust duct 23 which is conventionally connected to passageway 24, Figure 1, which forms the primary exhaust connection to the main exhaust pipe 25. This primary exhaust takes place when the piston is at the lower end of its travel and the perforations are uncovered.

Mounted on the upper end of the cylinders of motor block 16 are the rotary sleeve valve assemblies 13. Each of these sleeve valve assemblies is provided with a rotary sleeve 26, Figure 1, and a cut-off sleeve 27 which is conventionally mounted on an adjustable cut-off operating shaft 28. The rotary sleeve is preferably provided with a labyrinth 29 above each cylinder opposite valve port 30. The use of a labyrinth reduces side loading on the rotary sleeve under operating conditions and thus makes the rotary sleeve run more freely. Directly above each cylinder there is a main port 31 which opens into a combustible fluid collector 32. This combustible fluid collector extends around the under face of rotary sleeve 26 a distance equal to, or a little in excess of, the maximum inlet travel of the rotary sleeve for delivery of high pressure combustible fluid from the space inside of the cut-off sleeve through main valve port 30. The actual termination of the flow of these combustible fluids from inside of cut-off sleeve 27 is determined by the position of that sleeve relative to one side edge or the other of the combustible fluid collector depending upon the direction of the rotation of the engine crank shaft 18 and rotary sleeve 26.

Figure 2:
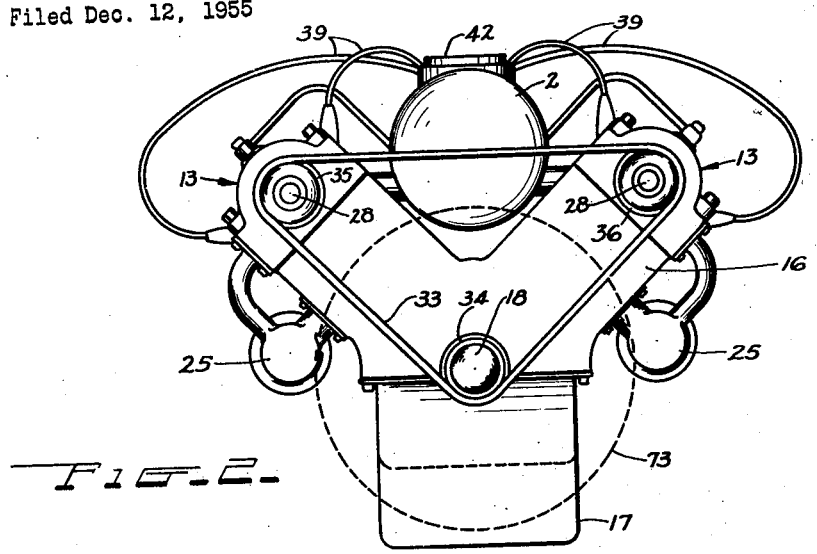
Figure 2 shows a diagrammatic rear end view of the engine of Figure 1 to illustrate the relative position of various of the parts, with some parts omitted for clarity of illustration.

It will be noted from Figure 2 that the silent chain drive 33 connects crank shaft 18 to the rotary sleeve 26 by means of equal size sprockets 34, 35 and 36. Thus it is clear that every time the crank shaft makes a complete revolution, the rotary sleeves 26 will make a like revolution in step therewith. An adjustable means 37, Figure 5, which adjustably joins sprocket 35 or 36 to the corresponding sleeve valve 26 for the driving of same is used to adjust the position of valve port 30 relative to the position of pistons 19 in their endwise movements. This permits determining the exact point at which inlet of combustible gaseous fluid is commenced into the cylinder. This can be varied over a considerable range, but normally the inlet should start before the piston reaches the end of its stroke. A common point for such inlet to take place is approximately at the start of the last 10° of rotation of the crank shaft before the piston reaches its uppermost position when the piston moves endwise very little.

It will be noted that at each end of the combustible fluid collector 32, Figure 1, there is mounted a spark plug 38. This places one or the other of the spark plugs in the path of inlet flow of fresh combustible gases regardless of in which direction the engine is rotating, a thing which facilitates better flame propogation and more efficient combustion. These spark plugs are connected by electrical connectors 39 to a conventional distributor (not shown) which operates in the standard well-recognized manner to time the ignition so that the combustion takes place immediately following the closing of valve port 30. Conventional mechanism (not shown) is provided for timing the ignition in this manner to prevent ignition of the combustible gaseous fluids before they leave the inside of the cut-off sleeve 27.

For compactness the compressor 2 can be mounted directly on top of the motor block 16 as shown in Figure 1, and when so mounted the high pressure air can be delivered from the compressor through air line 6. If desired the housing 45 of the rotary sleeve valve assembly 13 can be provided with a cooling fluid jacket 40 to maintain the rotary sleeve valve assembly at a more uniform temperature once the engine has warmed up. The conventional lubricating pump (not shown) of the engine can, if desired, be connected by means of tubing 41 to the rotary sleeve valve assembly 13 to lubricate rotary sleeve 26 in its rotation. For convenience of illustration, the air inlet connection 42 to the compressor 2 has been shown at the top of that compressor in Figures 1 and 2.

The combustible gases are preferably supplied to the engine under pressures in the range of 150 to 600 pounds per square inch and are sufficient of themselves, even without ignition, to start the engine rotating under normal conditions. That pressure, however is drastically increased when the combustible gaseous fluid is ignited, and produces increased force for propelling the piston to the lower end of its travel, at which point the expanded products of combustion exhaust through perforations 22 so that the ultimate pressure within the cylinder closely approaches atmospheric pressure at the start of the up stroke of the piston. However, in view of the closeness of clearance of the piston relative to the upper end of the cylinder, it is necessary to provide some means for permitting the escape of a major portion of the residual products of combustion in the cylinder. A preferred way of accomplishing this is shown in Figures 1, 5, 6 and 7. Here between cylinders, in housing 45 of the rotary sleeve valve assembly 13, there is provided a suitable number of secondary exhaust passageways 43 each of which is preferably positioned to exhaust at one side of the rotary sleeve valve assembly and in communication in a prescribed area with the under side of the rotary sleeve 26. This rotary sleeve is provided with a longitudinal slot 44, Figure 5, which communicates with the combustible fluid collector 32 to provide an escape for products of combustion from the interior of the cylinder during the travel of the piston in upward direction, and terminating just before the start of inlet of fresh combustible gaseous fluid to the cylinder takes place through valve port 30. This drastically reduces the amount of products of combustion in the cylinder at the start of the next cycle of operation so that it is a negligible and substantially harmless component of the new mixture when same is exploded. The pressure and turbulence of the new mixture also aids in propagating the flame through same when ignition takes place. It should be mentioned at this time that the longitudinal slot 44 does not quite reach the side edge of labyrinth 29, and accordingly, the pressure equalizing action of the labyrinth is not interfered with nor the functioning of the rotary sleeve valve 26 for the purpose intended.

Mounted on the outer end of closure cap 46, Figures 5 and 8, by means of rod members 47 and 48, is a body member 49, and a gasket 50. Body member 49 is bored to form a close fit for cut-off operating shaft 28 and counterbored to receive packing 51, preferably of the graphite type, retained with a brass ring 52 and compressed by a gland 53 which is tightenable to compress said packing through the use of screws 54, Figure 8. In the end of closure cap member 46 is a bearing 55 in which is mounted hub member 56 of rotary sleeve 26. Closure cap 46 also acts as the gaseous fluid inlet member through its connection to inlet pipe 57, Figures 3, 4 and 5. Rotary sleeve 26 in turn is provided with a series of perforations 58, at gaseous fluid chest chamber 59 of closure cap 46, for passage of gaseous fluid under pressure from inlet pipe 57 into the interior of rotary sleeve 26 and cut-off sleeve 27.

In order to operate the cut-off sleeve 27, and thus control operation of the engine, there is provided at the end of the rotary sleeve valve 13 carrying closure cap 46, and mounted on the latter, a control mechanism 60, Figures 5, 8 and 9. A simple form of this control mechanism utilizes a pair of parallel rod members 47 and 48 on which is mounted an endwise movable head member 61 through which passes cut-off operating shaft 28. This shaft has on its outer end a ring 62 and pin 63 which holds the same against being pulled back through head member 61. At the opposite side of head member 61, and also anchored to shaft 28 by means of a second pin 64, is an operating arm 65 carrying an operating knob 66 adapted for use in the conventional movement of operating arm 65 for the rotation of shaft 28 carrying cut-off sleeve 27 and the holding of such shaft in various positions. Head member 61 is graduated to indicate forward or reverse operation of the engine and also the extent of cutoff for either of these operations. This head member 61 is also preferably provided with bosses 67 and 68 which, if desired, may be fitted with bushings 69 and 70 for ease of endwise sliding on rod members 47 and 48. This sliding action may be controlled by knob member 71 mounted on a threaded shank 72 for frictionally gripping the side of rod member 48 which is preferably graduated to indicate the amount of throttling at different in and out settings of control mechanism 60. This showing is to be considered as diagrammatic of the various constructions adapted for use in operating the cut-off sleeve 27, which in turn controls operation of the engine.

The movement of operating arm 65 thus enables the setting of cut-off sleeve 27 from a position of zero cut-off, through a short cut-off on around to a point where the combustible gaseous fluid is permitted to enter the cylinder during a major portion of the piston's downward stroke, all of which may be accomplished step by step by rotating cut-off sleeve 27 counterclockwise until its trailing edge is substantially diametrically opposite from that where the minimum cut-off takes place. On the other hand, by rotating the cut-off sleeve in the opposite direction, rotation of the engine will be in reverse direction and again the same series of zero to maximum cut-off positions can be accomplished by then rotating the cut-off sleeve correspondingly in clockwise direction. Before changing direction of rotation of the engine the cut-off sleeve 27 should first be moved endwise to full throttling position and then rotated to set the cut-off sleeve at the desired operating position whereupon the cut-off sleeve can be returned from full throttling position to operating position meeting the desired operating condition.

Other modes of applying the principle of my invention may be employed instead of those explained, change being made as regards the apparatus herein disclosed, provided the means stated by any of the following claims or the equivalent of such stated means be employed:

I therefore particularly point out and distinctly claim as my invention:

1. An internal combustion engine of the piston and cylinder type utilizing a rotary valve assembly and wherein each cylinder has a power stroke for every downward movement of the piston, which comprises a rotary sleeve valve with ports, a housing in which said sleeve valve rotatably and closely but freely fits, a source of high pressure combustible gaseous fluid, an inlet connection into said rotary valve assembly for said combustible gaseous fluid, said housing having a combustible fluid collector over the upper end of each cylinder connected to said rotary valve assembly, each said fluid collector being exposed full length to the side of the rotary sleeve, said rotary sleeve having a main inlet port for each cylinder, each of said combustible fluid collectors and the corresponding rotary sleeve port determining the starting point of inlet of said gaseous fluid into each cylinder, said rotary sleeve port being longitudinally long but relatively narrow to facilitate close control of the flow of said gaseous fluid supplied to each cylinder, means for driving said rotary sleeve so that the inlet port for each cylinder is ready to start opening to deliver said gaseous fluid to the latter through said combustible fluid collector when said piston is at the end of said cylinder adjacent said inlet valve assembly, adjustable cut-off means for determining over a continuous range the amount of rotative travel of said rotary sleeve, in either direction, during which said gaseous fluid is delivered to each said cylinder, means for igniting said combustible gaseous fluid in said cylinder at the end of delivery of said gaseous fluid thereinto, an exhaust groove for each cylinder in the outer face of said rotary sleeve, and an exhaust port means in said housing, said exhaust groove connecting said combustible fluid collector with said exhaust port means after said ignited combustible fluid has expanded, and continuing such connection until just short of admitting a fresh charge of combustible fluid into said combustible fluid collector.

2. An internal combustion engine of the piston and cylinder type utilizing a rotary valve assembly and wherein each cylinder has a power stroke for every downward movement of the piston, which comprises a rotary sleeve valve with ports, a housing in which said sleeve valve rotatably and closely but freely fits, a source of high pressure combustible gaseous fluid, an inlet connection into said rotary valve assembly for said combustible gaseous fluid, said housing having a combustible fluid collector over the upper end of each cylinder connected to said rotary valve assembly, each said fluid collector being exposed full length to the side of the rotary sleeve, said fluid collector also extending substantially symmetrically over the cylinder and around the under side of said rotary sleeve a distance at least equal to the maximum inlet travel of the rotary sleeve port to facilitate uniform inlet of combustible fluid under conditions of engine rotation in either direction, a spark plug at each side edge of said fluid collector so that one of said spark plugs is exposed to fresh combustible fluid regardless of the direction in which the engine is operated, said rotary sleeve having a main inlet port for each cylinder, each of said combustible fluid collectors and the corresponding rotary sleeve port determining the starting point of inlet of said gaseous fluid into each cylinder, said rotary sleeve port being longitudinally long but relatively narrow to facilitate close control of the flow of said gaseous fluid supplied to each cylinder, means for driving said rotary sleeve so that the inlet port for each cylinder is ready to start opening to deliver said gaseous fluid to the latter through said combustible fluid collector when said piston is at the end of said cylinder adjacent said inlet valve assembly, adjustable cut-off means for determining over a continuous range the amount of rotative travel of said rotary sleeve, in either direction, during which said gaseous fluid is delivered to each said cylinder, means for igniting said combustible gaseous fluid in said cylinder at the end of delivery of said gaseous fluid thereinto, and means for exhausting the products of combustion of said gaseous fluid after expanding same.

3. An internal combustion engine as set forth in claim 2; wherein said means for exhausting the products of combustion of said gaseous fluid after expanding same comprises an exhaust groove for each cylinder in the outer face of said rotary sleeve, and an exhaust port means in said housing, said exhaust groove connecting said combustible fluid collector with said exhaust port means after said ignited combustible fluid has expanded, and continuing such connection until just short of admitting a fresh charge of combustible fluid into said combustible fluid collector.

4. An internal combustion engine as set forth in claim 3; wherein said exhaust groove for each cylinder is on the outer surface of said rotary sleeve, extends longitudinally thereof, and is diametrically opposite to the rotary sleeve inlet port for the corresponding cylinder, whereby the exhaust of products of combustion through said exhaust groove and exhaust port means for each cylinder is equally effective for operation of the engine when rotating in either direction.

5. In a multi-cylinder internal combustion engine of the character described which has a rotary sleeve valve assembly comprising a housing and a rotary sleeve therein, said housing having an exhaust port means and a combustible fluid collector for and opening into each cylinder, each of said exhaust port means having a circumferential groove in the inner face of said housing independent of said fluid collector, said rotary sleeve having a combustible fluid outlet port from the interior thereof into said combustible fluid collector of each cylinder, a variable cut-off means within said rotary sleeve for controlling the duration of delivery of combustible fluid into said collector, and a separate longitudinal exhaust groove for each cylinder in the outer face of said rotary sleeve, each of said longitudinal exhaust grooves connecting a combustible fluid collector with an exhaust port means after the combustible fluid has been expanded, said circumferential groove being of a length such that the connection will be continued throughout a large portion of the exhaust stroke and until just short of admitting a fresh charge of combustible fluid into said combustible fluid collector.

6. In a multi-cylinder internal combustion engine of the character described which has a rotary sleeve valve assembly comprising a housing and a rotary sleeve therein, said housing having an exhaust port means and a combustible fluid collector for and opening into each cylinder, each of said exhaust port means having a circumferential groove in the inner face of said housing independent of said fluid collector, said rotary sleeve having a combustible fluid outlet port from the interior thereof into said combustible fluid collector of each cylinder, a variable cut-off means within said rotary sleeve for controlling the duration of delivery of combustible fluid into said collector, pressure equalizing labyrinths between said sleeve valve and said housing, said labyrinths being connected to said combustible fluid collectors with each cylinder having its own independent labyrinth, and a separate longitudinal exhaust groove for each cylinder in the outer face of said rotary sleeve, each of said longitudinal exhaust grooves connecting a combustible fluid collector with an exhaust port means after the combustible fluid has been expanded, said circumferential groove being of a length such that the connection will be continued throughout a large portion of the exhaust stroke and until just short of admitting a fresh charge of combustible fluid into said combustible fluid collector.

7. A reversible uniflow piston type internal combustion engine having at least three cylinders and which has an expansion power stroke for each cylinder per revolution, which comprises rotary sleeve valve assembly means for the upper end of said cylinders, said sleeve valve assembly including a housing, sleeve valve, cut-off means, and means for controlling the cut-off means, a source of high pressure combustible gaseous fluid, combustible fluid collectors in said housing, each of said combustible fluid collectors being over a corresponding cylinder and extending substantially symmetrically crosswise of same, an outlet port in said sleeve valve for each cylinder thereunder, each said port in said sleeve valve being adapted to deliver high pressure combustible fluid into a combustible fluid collector when the piston in the corresponding cylinder is closely approaching the upper end of its stroke when the engine is rotating in either direction, pressure equalizing labyrinths between said sleeve valve and said housing, said labyrinths being connected to said combustible fluid collectors, a spark plug at each side edge of each combustible fluid collector so that one of said spark plugs is in the path of fresh combustible fluid during the inlet period regardless of which direction the engine is rotating, means for delivering a suitable electrical voltage to said spark plugs at the end of the inlet of combustible gaseous fluid to said combustible fluid collector and through it into the corresponding cylinder so as to ignite same, a main exhaust duct, said cylinders having exhaust ports in the cylinder walls at the top of the piston when in its lowermost position, a primary exhaust duct connecting said exhaust ports to said main exhaust duct, a residual exhaust port means in said housing, an exhaust groove for each cylinder in the outer face of said rotary sleeve and at the opposite side of same from the port in said rotary sleeve for the corresponding cylinder, said exhaust groove connecting said combustible fluid collector with said residual exhaust port means for the corresponding cylinder after the main exhausting has taken place, and continuing such connection, regardless of the direction of rotation of said engine, until just short of admitting a fresh charge of combustible gaseous fluid into said combustible fluid collector and cylinder for starting the next cycle of operation, and duct means connecting said residual exhaust port means to said main exhaust duct.

References Cited in the file of this patent

UNITED STATES PATENTS

| | | |
|---|---|---|
| 1,167,419 | Magill | Jan. 11, 1916 |
| 1,693,484 | Johnson | Nov. 27, 1928 |
| 1,709,879 | Roux | Apr. 23, 1929 |
| 2,346,207 | Brown | Apr. 11, 1944 |